US005774794A

United States Patent [19]

Kido

[11] Patent Number: 5,774,794

[45] Date of Patent: Jun. 30, 1998

[54] ANTENNA FOR A PORTABLE RADIO TELEPHONE

[75] Inventor: Takashi Kido, Tokyo, Japan

[73] Assignee: Harada Kogyo Kabushiki Kaisha, Tokyo, Japan

[21] Appl. No.: 420,406

[22] Filed: Apr. 12, 1995

[51] Int. Cl.[6] .................... H04B 1/034

[52] U.S. Cl. .................... 455/97; 455/550; 343/702

[58] Field of Search .................... 455/97, 89, 90, 455/550, 562, 575; 343/702

[56] References Cited

U.S. PATENT DOCUMENTS

| | | | |
|---|---|---|---|
| 4,860,024 | 8/1989 | Egashira | 343/702 |
| 5,434,582 | 7/1995 | Koike et al. | 343/702 |
| 5,551,069 | 8/1996 | Harrison et al. | 455/90 |

*Primary Examiner*—Nguyen Vo
*Assistant Examiner*—Darnell R. Armstrong
*Attorney, Agent, or Firm*—Koda & Androlia

[57] ABSTRACT

An antenna for radio communications such as portable telephone systems including a rod-form antenna element installed in the case of a radio communication set so that the antenna element can be retracted and pulled out with one portion of the antenna element remains outside of the case when the antenna element is accommodated inside the case; an impedance matching device connected to the feeding point of the antenna element and to the radio communication set; a stub which is a grounded conductive member and is installed so as to surround the outer circumference of the antenna element without touching the antenna element when the antenna element is accommodated inside the case. The base end of the antenna element and the base end of the stub are electrically coupled when the antenna element is completely accommodated inside the case so that good impedance matching can be obtained even when the antenna element is accommodated inside the case and that incoming calls are received without any failure.

1 Claim, 6 Drawing Sheets

ANTENNA FOR A PORTABLE RADIO TELEPHONE

BACKGROUND OF THE INVENTION

1. Field of the Invention

The present invention relates to an antenna for radio communications installed in a case in which a radio communication set such as a portable telephone, etc. is accommodated so that the antenna can be freely pulled out.

2. Prior Art

Generally, in antennas of this type for radio communications (i.e., for use in portable telephones), a rod-form antenna element is provided inside an antenna accommodating element of the case for a radio communication set so that the antenna element is pulled out and then pushed back in. In addition, a feeding element which is made of conductive material and is provided so as to be in contact with and electrically coupled to the antenna element at its one end is connected to the radio communication set via an impedance matching device at its another end.

The conventional antennas for radio communications as described above, however, have the following problems: The impedance matching device is generally adjusted so that matching is obtained when the rod-form antenna element is pulled out of the case. As a result, when the rod-form antenna element is kept inside of the case, the matched state is lost, and incoming call signals which are received when the antenna element is accommodated inside the case are conspicuously attenuated. Thus, it would occur in some cases that the answer to the call signals is not made in an appropriate manner.

FIGS. 6(*a*) and (*b*) show the results obtained when the antenna characteristics of a conventional antenna for radio communications are actually measured while its antenna element remained inside the case. FIG. 6(*a*) is a Smith chart, and FIG. 6(*b*) is an SWR characteristic diagram. As is clear from FIGS. 6(*a*) and (*b*), both the impedance characteristics and the SWR characteristics are unsatisfactory when the antenna element is inside the case. Thus, the antenna is not usable.

SUMMARY OF THE INVENTION

The object of the present invention is to provide an antenna for radio communications as described below:

(1) The antenna for radio communications, in which good impedance matching is obtained not only when the antenna element is pulled out to the outside of the case but also when the antenna element is kept retracted inside the case, so that it is possible to perform good radio communications when the antenna element is outside the case, and an incoming call answering action can be made without failure even when the antenna element is inside the case.

In order to solve the problems and accomplish the object, the antenna for radio communications provided by the present invention is constructed in the following manner: (1) The antenna for radio communications provided by the present invention includes: a rod-form antenna element which is installed in the case of a radio communication set so that the antenna element can be pulled out of and retracted in the case and so that a portion of the antenna element is left outside the case when the antenna element is retracted inside the case; an impedance matching device with one end thereof connected to a feeding point of the antenna element and another end thereof connected to the radio communication set; a stub which is a grounded conductive member and is installed to surround the outer circumference of the antenna element in a non-contact fashion when the antenna element is inside the case; and a means for providing a contact electrical continuity between the base end part of the antenna element and the base end part of the stub when the antenna element is completely retracted inside the case.

As a result of adopting the means described above, the present invention performs the following functions:

(1) In the antenna for radio communications provided by the present invention, when the antenna element is retracted into the interior of the case, the base end part of the antenna element comes into contact with the base end part of the stub so as to establish an electrical continuity and be grounded, and the outer circumference of other portions of the antenna element is surrounded by the extended portion of the stub in a non-contact fashion. Accordingly, an impedance conversion of the antenna element occurs so that the antenna characteristics are stabilized. Thus, even when the antenna element is accommodated inside the case, the antenna characteristics which are comparable to the characteristics obtained when the antenna element is extended to the outside of the case are obtained.

DETAILED DESCRIPTION OF THE INVENTION

Figure 1A:
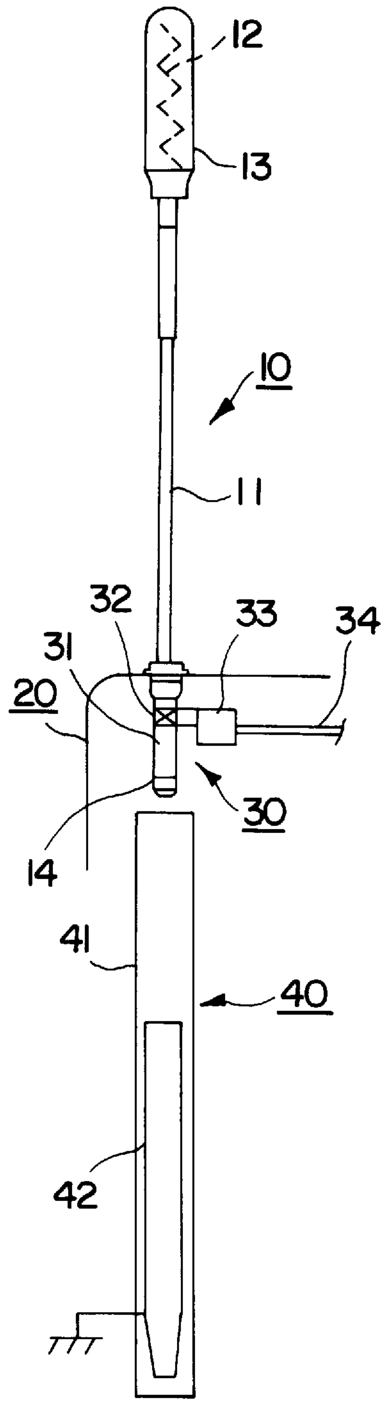
FIG. 1 is a schematic side view showing the construction of a first embodiment of the antenna of the present invention, in which FIG. 1(*a*) shows the antenna element extended from the case, and FIG. 1(*b*) shows the antenna element accommodated inside the case.
Figure 1B:
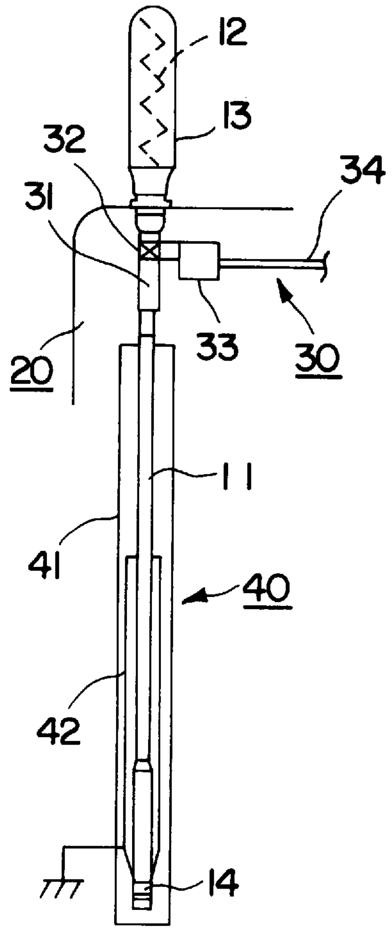
Figure 2A:
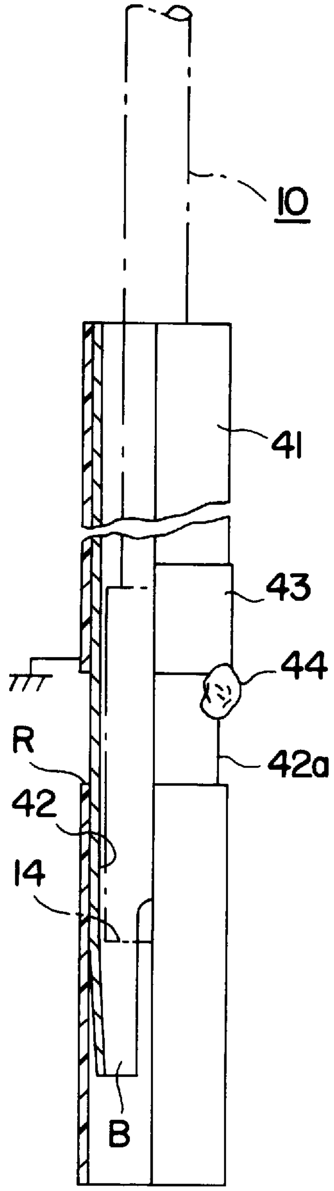
FIG. 2 shows essential parts of the antenna of the same embodiment, in which FIG. 2(*a*) is a side view which shows the antenna element accommodating element with the left half cut away, and FIG. 2(*b*) is a perspective view of the stub.
Figure 2B:
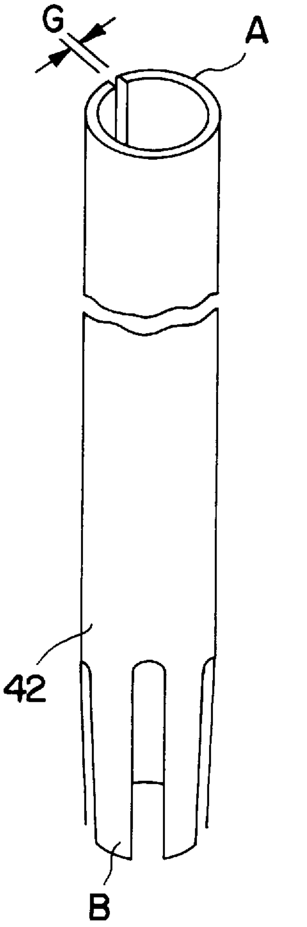

FIGS. 1(*a*) and 1(*b*) are schematic side views which illustrate one embodiment of the antenna of the present invention used in a portable telephone wherein FIG. 1(*a*) shows the antenna element extended from the case, while FIG. 1(*b*) shows the antenna element accommodated inside the case. FIGS. 2(*a*) and 2(*b*) illustrate essential portions of the antenna of the same embodiment wherein FIG. 2(*a*) is a side view which shows the antenna element accommodating element with the left half cut away, and FIG. 2(*b*) is a perspective view of the stub.

In FIGS. 1 and 2, 10 indicates a rod-form antenna element, 20 indicates the case of a radio communication set (portable telephone), 30 indicates an antenna attachment and feeding mechanism, and 40 indicates an antenna element accommodating element.

The antenna element 10 consists mainly of a rod-form conductor 11 and is installed in the case 20 so that the antenna element can be freely retracted into and pulled out of the case. A helical antenna element 12 which is used for incoming calls is accommodated inside a plastic knob part 13 and connected to the tip end of the rod-form conductor 11. Thus, as shown in FIG. 1(*b*), when the antenna element 10 is retracted inside the case 20, the helical antenna element 12 used for incoming calls is left exposed outside the case 20. Furthermore, a cylindrical conductive contact element 14 is attached to the base end part of the conductor 11 of the antenna element 10.

The case 20 of the radio communication set is formed from, for example, a hard synthetic resin, etc. A portable telephone which is the radio communication set (not shown in the drawings) is housed inside the case 20.

The antenna attachment and feeding mechanism 30 is comprised of an antenna element retaining tube 31 and a feeding element 32. The retaining tube 31 is mounted to the antenna attachment part of the case 20, and the feeding element 32 forms a feeding point of the antenna element retaining tube 31; in other words, the feeding element 32 is made of a conductive material and installed so that a contact electrical continuity is established between the retaining tube 31 and the antenna element 10. To this feeding element 32, one end of an impedance matching device 33 is connected, and the other end of the impedance matching device 33 is connected to the radio communication set via a coaxial feeder cable 34.

The antenna element accommodating element 40 comprises a plastic accommodating tube 41 and a roughly cylindrical stub 42. The plastic accommodating tube 41 is used to accommodate the antenna element 10 (strictly speaking, the antenna element 10 excluding the knob part 13) in a stable manner when the antenna element 10 is retracted into the interior of the case 20, and the roughly cylindrical stub 42 is made of a conductive material and is installed on the inside circumferential surface of the plastic accommodating tube 41. The stub 42 is installed inside the accommodating tube 41 so as to surround the outer circumference of the antenna element 10 when the antenna element is retracted into the hollow interior of the accommodating tube 41 in such a manner that the antenna element does not come into contact with the stub 42. The base end part (lower end part in the drawings) of the stub 42 is grounded.

As shown in FIG. 2, an annular cut-out area R is formed at one portion of the accommodating tube 41 so that one portion 42*a* of the stub 42 is exposed to the outside through this cut-out area R. The portion 42*a* of the stub 42 which is exposed through the cut-out area R is connected by means of, for example, solder 44 to a grounding ring 43 which is made of a conductive material and is fitted over the outer circumference of the accommodating tube 41. The grounding ring 43 is grounded via a ground line which is not shown in the drawings. Thus, the base end part of the stub 42 is grounded via the grounding ring 43. The stub 42 is, as shown in FIG. 2(*b*), formed by bending a conductive plate-form member A, which has a rectangular shape, into a roughly cylindrical shape so that the cross section of the stub 42, which is perpendicular to the axial direction, is C-shaped. In other words, a gap G of approximately 1 mm is formed in the circumferential wall of the stub 42 along the length of the stub 42. The stub 42 has a plurality of slit-form notches in the base end area, forming a plurality of tongue parts B. These tongue parts B are bent inwardly (or toward the axial center of the stub) so that they are bent more gradually towards the tip ends of the tongue parts B. In other words, the diameter of the base end area of the stub 42, where the tongue parts B are made, gradually decreases towards the tip end.

When the antenna element 10 is inserted and completely accommodated inside the antenna element accommodating element 40 which is thus constructed and equipped with the stub 42, the outer circumferential surface of the conductive contact element 14 provided at the base end of the antenna element 10 is pressed against the inside circumferential surfaces of the tongue parts B that are bent inwardly at the base end area of the stub 42, and a contact electrical continuity is established between the conductive contact element 14 and the rectangular tongue parts B.

The structure, function and effects of the embodiment described above may be summarized as follows:

(1) The antenna of the present embodiment for radio communications includes: a rod-form antenna element 10 which is installed in the case 20 of a radio communication set so that the antenna element 10 can be freely pulled out and retracted with a portion of the antenna element 10 left outside of the case 20 when the antenna element 10 is inside the case 20; an impedance matching device 33 with one end thereof connected to the feeding point of the antenna element 10 and another end thereof connected to the radio communication set; a stub 42 which is a grounded conductive member and is installed so as to surround the outer circumference of the antenna element 10 in a non-contact fashion when the antenna element 10 is accommodated inside the case 20; and a means which provides a contact electrical continuity between the base end part (conductive contact element 14) of the antenna element 10 and the base end part of the stub 42 when the antenna element 10 is completely retracted inside the case 20.

Accordingly, in the apparatus of the present embodiment, when the antenna element 10 is retracted into the interior of the case 20, the antenna element 10 is grounded as a result of the contact electrical continuity with the base end part of the stub 42, and in this case, the outer circumference of the remaining part of the antenna element 10 is surrounded by but not in contact with the stub 42. Accordingly, an impedance conversion in the antenna element 10 occurs so that the antenna characteristics can be stable; and even when the antenna element 10 is accommodated inside the case 20, the antenna characteristics which are the same as the antenna characteristics obtained when the antenna element 10 is extended out of the case 20 is obtainable.

Figure 3A:
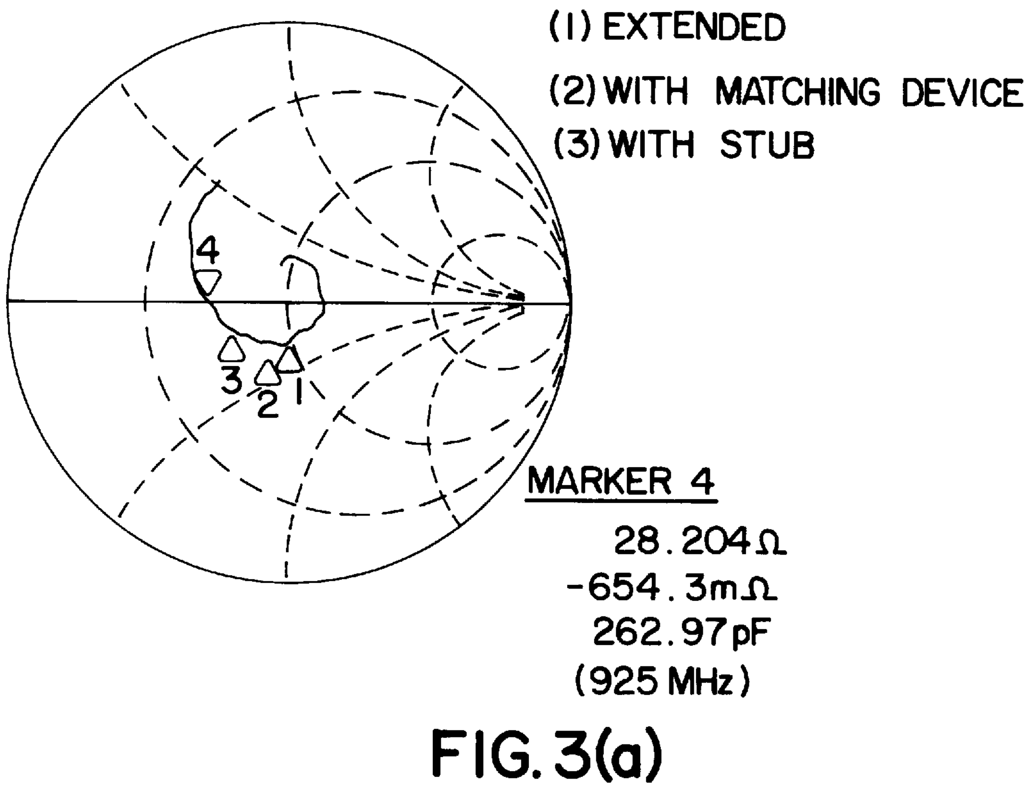
FIG. 3 shows the results of actual measurements of the antenna characteristics obtained when the antenna element 10 of the antenna of the embodiment is in an extended state, in which FIG. 3(*a*) is a Smith chart, and FIG. 3(*b*) is an SWR characteristic diagram.
Figure 3B:
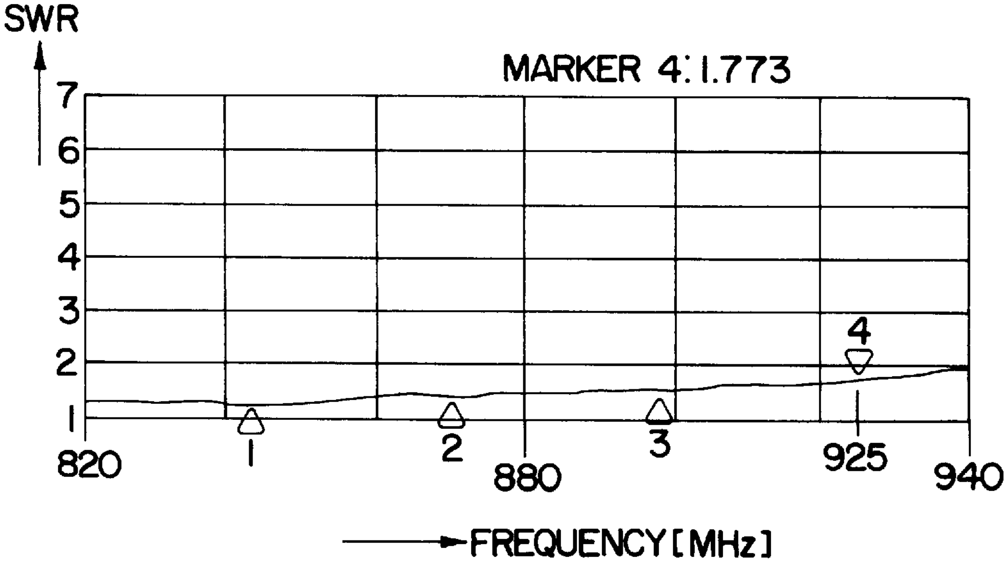

FIGS. 3(*a*) and 3(*b*) show the results of actual measurements of the antenna characteristics obtained when the antenna element 10 of the antenna of the present embodiment is extended out. FIG. 3(*a*) is a Smith chart, and FIG. 3(*b*) is an SWR characteristic diagram.

Figure 4A:
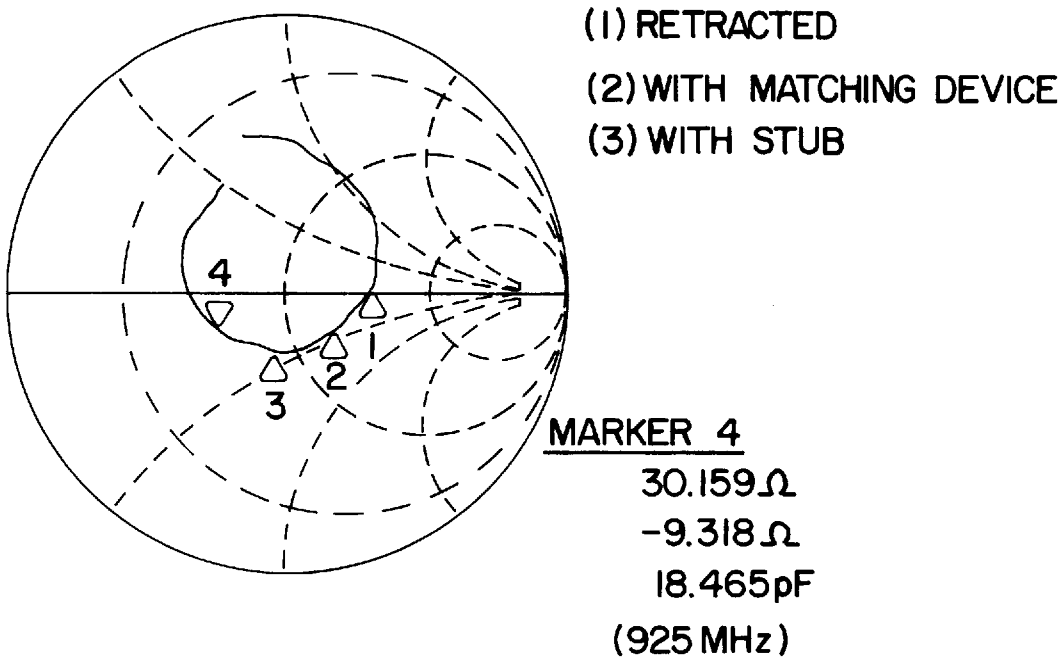
FIG. 4 shows the results of actual measurements of the antenna characteristics obtained when the antenna element 10 of the antenna of the embodiment is in a retracted state, in which FIG. 4(*a*) is a Smith chart, and FIG. 4(*b*) is an SWR characteristic diagram.
Figure 4B:
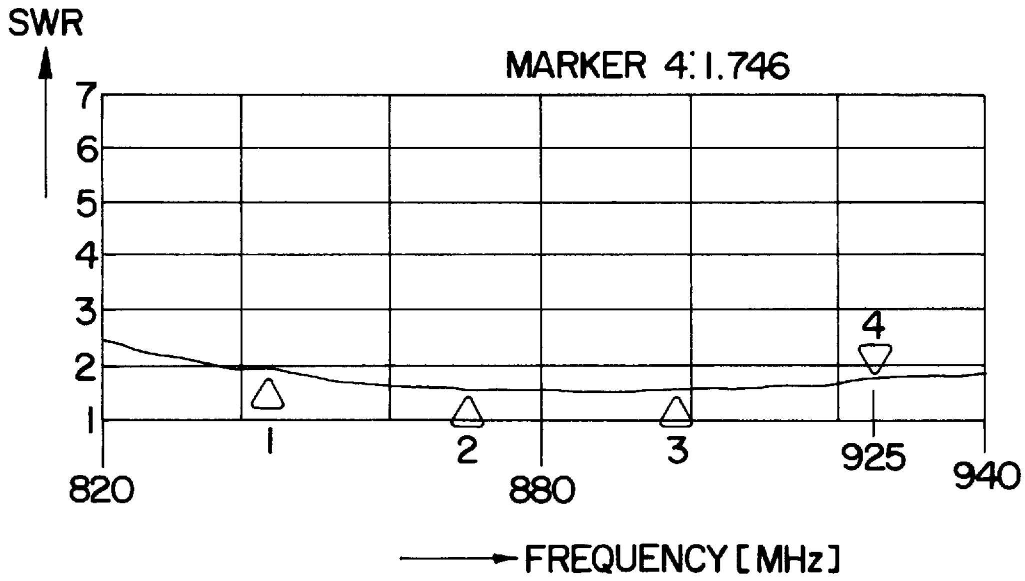

FIGS. 4(*a*) and 4(*b*) show the results of actual measurements of the antenna characteristics obtained when the antenna element 10 of the antenna of the same embodiment is retracted inside. FIG. 4(*a*) is a Smith chart, and FIG. 4(*b*) is an SWR characteristic diagram.

As seen from FIGS. 3(*a*) and 3(*b*) and FIGS. 4(*a*) and 4(*b*), the antenna of the present embodiment has extremely good antenna characteristics in both extended and retracted states.

Figure 5A:
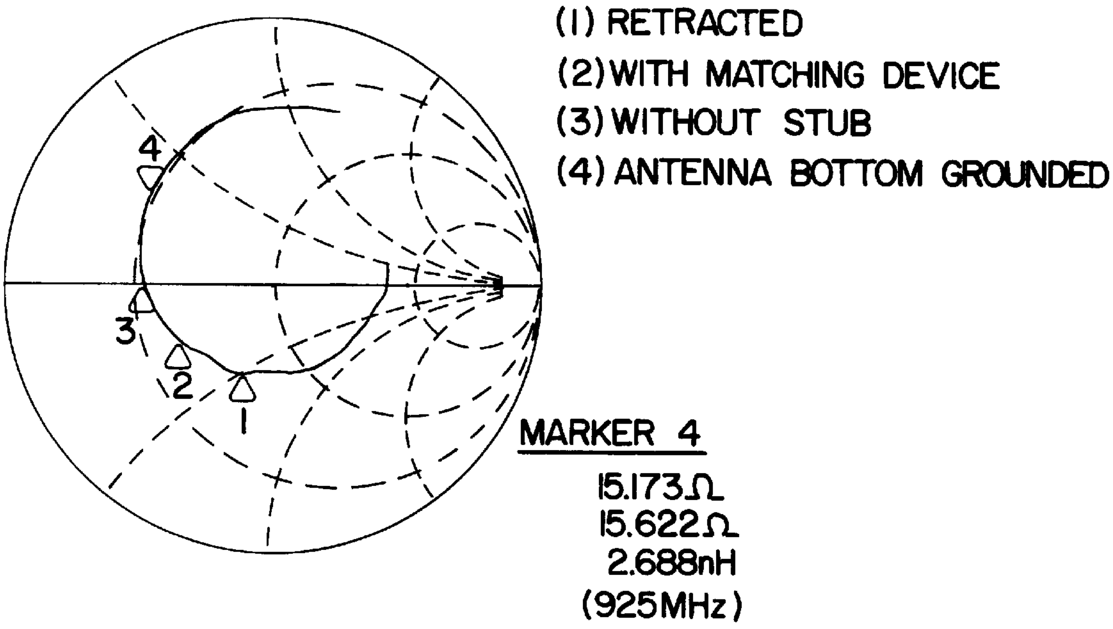
FIG. 5 shows the results of actual measurements of the antenna characteristics obtained, in order to confirm the effectiveness of the stub used in the antenna of the embodiment, when the antenna element is accommodated inside the accommodating tube without installing the stub, and the base end part of the accommodated antenna element 10 is grounded, in which FIG. 5(*a*) is a Smith chart, and FIG. 5(*b*) is an SWR characteristic diagram.
Figure 5B:
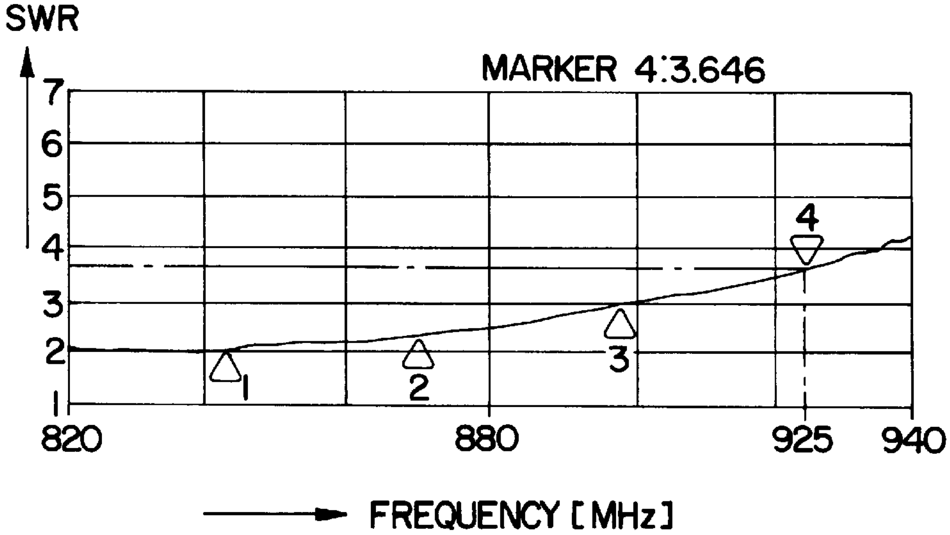
Figure 6A:
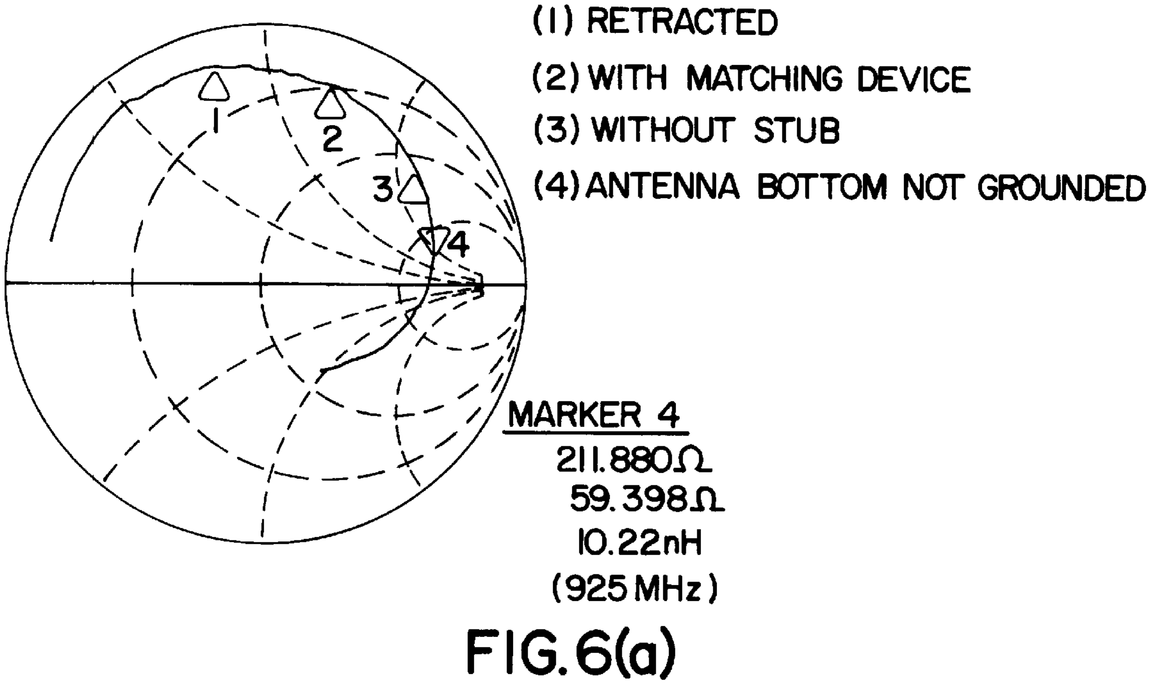
FIG. 6 shows drawbacks encountered in a conventional antenna for radio communications, in which FIG. 6(*a*) is a Smith chart, and FIG. 6(*b*) is an SWR characteristic diagram.
Figure 6B:
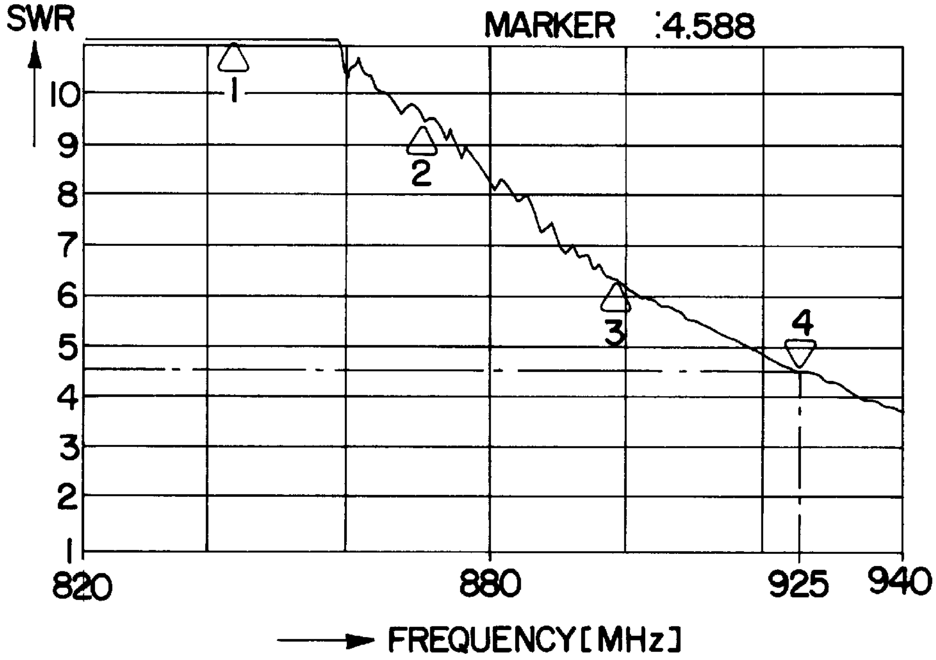

Furthermore, FIGS. 5(*a*) and 5(*b*) show the results of actual measurements of the antenna characteristics obtained when the effectiveness of the stub 42 used in the antenna of the present embodiment is observed. In this case, the antenna element 10 is accommodated inside the accommodating tube 41, the tube 41 has no stub 42 therein, and the base end part (conductive contact element 14) of the accommodated antenna element 10 is grounded. FIG. 5(*a*) is a Smith chart, and FIG. 5(*b*) is an SWR characteristic diagram.

As is clear from a comparison of FIGS. 4(*a*) and 4(*b*) with FIGS. 5(*a*) and 5(*b*), the antenna characteristics obtained with the antenna element 10 in a retracted state are greatly improved if the stub 42 is provided in the tube 41.

(2) The antenna of the present embodiment is constructed as described in (1) above, and the base end part of the stub 42 which provides a contact electrical continuity with the base end part of the antenna element 10 is grounded.

Accordingly, the base end part of the antenna element 10 is grounded with the shortest possible grounding distance, and the grounding effect of the stub 42 with respect to the antenna element 10 is improved.

(3) The antenna of the present embodiment is constructed as described in (1) above, and the stub 42 is formed by bending a conductive plate-form member A into a roughly cylindrical shape so that the cross section of the stub 42 which is perpendicular to the axial direction is C-shaped.

Accordingly, when the stub 42 is installed inside the cylindrical antenna element accommodating tube 41, it is only necessary to roll the conductive plate-form member A into the form of a cylindrical tube and then insert the tube into the accommodating tube 41, since the elastic recovery force of the conductive plate-form member A itself can cause the conductive plate-form member to be set tightly inside the circumferential surface of the antenna element accommodating tube 41, and the stub 42 can be retained in a stable manner. Accordingly, the work of installing the stub 42 is greatly simplified, manufacture is facilitated and manufacturing costs are reduced.

(4) The antenna of the present embodiment includes the following modifications:

A modification in which a contact electrical continuity element made of a spring member is additionally provided so as to be integrally coupled to the base end part of the stub 42 in order to obtain more secure contact electrical continuity between the base end part of the stub 42 and the base end part of the antenna element 10.

A modification in which the stub 42 is formed by installing a multiple number of rectangular conductive members one on the other on the inside circumferential surface of the accommodating tube 41.

A modification in which the stub 42 is formed by linking at least two conductive members which can be moved relative to each other in the axial direction, so that the length of the stub 42 is adjustable appropriately.

The present invention can provide the following antenna for radio communications:

(1) An antenna for radio communications in which good impedance matching is obtained whether the antenna element is pulled out of the case or retracted inside the case, so that it is possible not only to perform good radio communications when the antenna element is extended to the outside of the case but also to perform an appropriate incoming call answering action even when the antenna element is retracted inside the case.

I claim:

1. An antenna apparatus for a radio communication set, said antenna apparatus comprising:

an antenna installed in a case of said radio communication set so that said antenna can be extended from and retracted into said case, said antenna comprising a rod-form antenna element and a helical antenna element provided on a tip end of said rod-form antenna element, said helical antenna element remaining outside of said case and said rod-form antenna element being completely retracted into said case when said antenna is retracted into said case; and an impedance matching device, one end thereof being connected to a feeding point of said rod-form antenna element, and another end thereof being connected to said radio communication set;

a stub provided in said case, said stub being a grounded conductive member and surrounding an outer circumference of said rod-form antenna element so as not to be in contact with said rod-form antenna element when said rod-form antenna element is retracted inside said case; and a means for providing electrical connection between a base part of said rod-form antenna element and a base end part of said stub when said rod-form antenna element is completely retracted inside said case;

whereby said base end part of said rod-form antenna element is grounded when said antenna is retracted into said case and electrical characteristics of said antenna apparatus are substantially equal when the antenna is extended from and retracted into said case.

* * * * *

UNITED STATES PATENT AND TRADEMARK OFFICE

CERTIFICATE OF CORRECTION

PATENT NO. : 5,774,794
DATED : June 30, 1998
INVENTOR(S) : Takashi Kido

It is certified that error appears in the above-indentified patent and that said Letters Patent is hereby corrected as shown below:

On the title Page:
Item [30] Foreign Application Priority Data:

Add --Apr. 12, 1994 [JP] Japan ....... 6-073087--

Signed and Sealed this

First Day of September, 1998

Attest:

BRUCE LEHMAN

*Attesting Officer*

*Commissioner of Patents and Trademarks*